(12) United States Patent
Hicks et al.

(10) Patent No.: US 8,545,360 B2
(45) Date of Patent: Oct. 1, 2013

(54) VARIABLE RATIO TRANSMISSION

(75) Inventors: Raymond John Hicks, Llangammarch Wells (GB); Frank Cunliffe, Chipping Campden (GB)

(73) Assignee: Orbital 2 Limited, Gloucestershire (GB)

( * ) Notice: Subject to any disclaimer, the term of this patent is extended or adjusted under 35 U.S.C. 154(b) by 468 days.

(21) Appl. No.: 12/663,411

(22) PCT Filed: Jun. 6, 2008

(86) PCT No.: PCT/GB2008/001953
§ 371 (c)(1),
(2), (4) Date: Jul. 26, 2010

(87) PCT Pub. No.: WO2008/149109
PCT Pub. Date: Dec. 11, 2008

(65) Prior Publication Data
US 2010/0279813 A1    Nov. 4, 2010

(30) Foreign Application Priority Data
Jun. 8, 2007 (GB) .................................. 0711043.0

(51) Int. Cl.
*F16H 48/06* (2006.01)
*F03D 9/00* (2006.01)
*H02P 9/04* (2006.01)

(52) U.S. Cl.
USPC ............................................. 475/220; 290/55

(58) Field of Classification Search
USPC .......................................... 475/220; 290/55
See application file for complete search history.

(56) References Cited

U.S. PATENT DOCUMENTS

| | | | |
|---|---|---|---|
| 4,613,760 A | 9/1986 | Law | |
| 4,774,855 A | 10/1988 | Murrell et al. | |
| 5,140,170 A * | 8/1992 | Henderson | 290/44 |
| 6,527,671 B2 * | 3/2003 | Paalasmaa et al. | 477/99 |
| 6,911,743 B2 * | 6/2005 | Ishizaki | 290/55 |
| 7,588,509 B1 * | 9/2009 | Marsha | 475/73 |
| 7,794,348 B2 * | 9/2010 | Tilscher et al. | 475/53 |
| 7,914,411 B2 * | 3/2011 | Basteck | 475/35 |
| 2003/0168862 A1 | 9/2003 | Ishizaki | |

FOREIGN PATENT DOCUMENTS

| | | |
|---|---|---|
| JP | 2006522281 A | 9/2006 |
| RU | 2122146 C1 | 11/1998 |
| SU | 1211449 A1 | 2/1986 |
| WO | WO81/01444 | 5/1981 |
| WO | WO91/19916 | 12/1991 |
| WO | WO2004/109157 | 12/2004 |

* cited by examiner

*Primary Examiner* — Justin Holmes
*Assistant Examiner* — Colby M Hansen
(74) *Attorney, Agent, or Firm* — King & Schickli, PLLC

(57) ABSTRACT

A variable ratio transmission having an infinitely variable ratio, for enabling a tidal turbine (10) or the like running at relatively low but continuously varying speeds, to drive smoothly a constant speed machine, such as a synchronous generator or the like, without excessive transient torques. A preferred transmission includes a primary differential gear train (120), having a driven input (50), and a driving output, wherein the ratio of the input speed to output speed is variable, and wherein said ratio is governed by the reaction torque provided by speed controlling gearing (150) within the primary differential (120), the transmission including a secondary differential gear train (220), which is in rotational communication with the input (50) via a first route (115), and is in rotational communication with the speed controlling gearing (150) via a second different route (125), wherein the secondary differential gear train includes two parallel power paths.

20 Claims, 8 Drawing Sheets

| Rotor speed [rpm] | Rotor torque [kNm] | Rotor power [kW] | Reaction 1 (180) torque [Nm] | Reaction 2 (500) torque [Nm] | Absolut Reaction 1 (180) speed [rpm] | Absolut Reaction 2 (500) speed [rpm] | Reaction 1 (180) stroke [-] | Reaction 2 (500) stroke [-] | pressure [bar] | By-pass power [kW] |
|---|---|---|---|---|---|---|---|---|---|---|
| 11.50 | 303.09 | 365.0 | 774.85 | 85.36 | 292.06 | -2651.29 | 0.950 | 0.038 | 284.730 | 23.70 |
| 11.73 | 315.12 | 387.1 | 773.52 | 112.55 | 370.39 | -2545.67 | 0.950 | 0.050 | 284.242 | 30.00 |
| 12.18 | 339.83 | 433.4 | 766.46 | 171.59 | 523.65 | -2339.02 | 0.950 | 0.077 | 281.647 | 42.03 |
| 12.63 | 365.47 | 483.4 | 751.46 | 238.55 | 676.90 | -2132.37 | 0.950 | 0.109 | 276.137 | 53.27 |
| 13.09 | 392.04 | 537.4 | 726.24 | 315.11 | 833.57 | -1921.13 | 0.950 | 0.148 | 266.868 | 63.39 |
| 13.54 | 419.54 | 594.9 | 693.58 | 399.21 | 986.82 | -1714.48 | 0.950 | 0.197 | 254.868 | 71.67 |
| 13.99 | 447.98 | 656.3 | 651.33 | 492.48 | 1140.08 | -1507.83 | 0.950 | 0.259 | 239.343 | 77.76 |
| 14.44 | 477.34 | 721.8 | 598.90 | 595.29 | 1293.33 | -1301.18 | 0.950 | 0.340 | 220.077 | 81.11 |
| 14.50 | 481.38 | 730.9 | 591.18 | 609.82 | 1313.77 | -1273.62 | 0.950 | 0.353 | 217.240 | 81.33 |
| 14.60 | 488.11 | 746.3 | 577.84 | 634.38 | 1347.82 | -1227.70 | 0.950 | 0.375 | 212.336 | 81.56 |
| 14.70 | 494.85 | 761.8 | 563.90 | 659.38 | 1381.88 | -1181.78 | 0.950 | 0.400 | 207.213 | 81.60 |
| 14.80 | 501.58 | 777.4 | 549.36 | 684.82 | 1415.94 | -1135.86 | 0.950 | 0.426 | 201.871 | 81.46 |
| 14.89 | 507.64 | 791.6 | 535.77 | 708.10 | 1446.59 | -1094.53 | 0.950 | 0.452 | 196.876 | 81.16 |
| 15.00 | 515.28 | 809.4 | 518.73 | 737.36 | 1484.05 | -1044.01 | 0.950 | 0.486 | 190.615 | 80.62 |
| 15.10 | 522.22 | 825.8 | 502.59 | 764.45 | 1518.11 | -998.09 | 0.950 | 0.520 | 184.685 | 79.90 |
| 15.20 | 529.16 | 842.3 | 485.84 | 791.99 | 1552.17 | -952.17 | 0.950 | 0.558 | 178.530 | 78.97 |
| 15.30 | 536.10 | 859.0 | 468.48 | 819.98 | 1586.22 | -906.25 | 0.950 | 0.599 | 172.149 | 77.82 |
| 15.34 | 538.88 | 865.7 | 461.36 | 831.31 | 1599.84 | -887.88 | 0.950 | 0.616 | 169.533 | 77.29 |
| 15.40 | 543.17 | 876.0 | 450.60 | 848.63 | 1620.28 | -860.32 | 0.950 | 0.644 | 165.579 | 76.46 |
| 15.50 | 550.31 | 893.2 | 432.16 | 877.87 | 1654.34 | -814.40 | 0.950 | 0.695 | 158.803 | 74.87 |
| 15.60 | 557.46 | 910.7 | 413.09 | 907.57 | 1688.39 | -768.48 | 0.950 | 0.751 | 151.795 | 73.04 |
| 15.70 | 564.61 | 928.3 | 393.38 | 937.75 | 1722.45 | -722.56 | 0.950 | 0.815 | 144.554 | 70.96 |
| 15.79 | 571.04 | 944.2 | 375.10 | 965.31 | 1753.10 | -681.23 | 0.950 | 0.880 | 137.838 | 68.86 |
| 15.90 | 579.13 | 964.3 | 352.21 | 999.91 | 1790.56 | -630.71 | 0.950 | 0.971 | 129.425 | 66.04 |
| 16.00 | 586.49 | 982.7 | 330.71 | 1031.87 | 1824.62 | -584.79 | 0.890 | 1.0 | 129.678 | 63.19 |
| 16.10 | 593.84 | 1001.2 | 308.57 | 1064.31 | 1858.68 | -538.87 | 0.805 | 1.0 | 133.755 | 60.06 |
| 16.20 | 601.20 | 1019.9 | 285.77 | 1097.24 | 1892.73 | -492.95 | 0.723 | 1.0 | 137.893 | 56.64 |
| 16.24 | 604.14 | 1027.4 | 276.46 | 1110.54 | 1906.36 | -474.58 | 0.692 | 1.0 | 139.565 | 55.19 |
| 16.70 | 638.17 | 1116.0 | 162.05 | 1269.50 | 2063.02 | -263.34 | 0.355 | 1.0 | 159.542 | 35.01 |
| 17.15 | 673.13 | 1208.9 | 36.79 | 1438.52 | 2216.27 | -56.69 | 0.071 | 1.0 | 180.783 | 8.54 |
| 17.2734 | 694.78 | 1256.8 | 0.00 | 1512.94 | 2258.31 | 0.00 | 0.000 | 1.0 | 190.136 | 0.00 |
| 17.30 | 699.43 | 1267.1 | -8.23 | 1529.19 | 2267.36 | 12.20 | -0.015 | 1.0 | 192.178 | -1.95 |
| 17.40 | 716.97 | 1306.4 | -40.18 | 1591.07 | 2301.42 | 58.12 | -0.070 | 1.0 | 199.955 | -9.68 |
| 17.40 | 1096.88 | 1998.7 | -61.47 | 2434.15 | 2301.42 | 58.12 | -0.070 | 1.0 | 305.907 | -14.82 |
| 17.5817 | 1096.88 | 2019.5 | -149.76 | 2499.63 | 2363.32 | 141.60 | -0.166 | 1.0 | 314.136 | -37.06 |
| 18.00 | 1096.88 | 2067.6 | -352.90 | 2650.28 | 2650.28 | 333.65 | -0.370 | 1.0 | 333.069 | -92.60 |
| 18.20 | 1096.88 | 2090.5 | -450.04 | 2722.32 | 2722.32 | 425.50 | -0.459 | 1.0 | 342.123 | -121.30 |
| 18.40 | 1089.87 | 2100.0 | -543.68 | 2776.49 | 2776.49 | 517.34 | -0.544 | 1.0 | 348.930 | 150.42 |
| 18.60 | 1078.15 | 2100.0 | -633.32 | 2817.45 | 2817.45 | 609.19 | -0.624 | 1.0 | 354.078 | -179.74 |
| 18.80 | 1066.68 | 2100.0 | -721.05 | 2857.53 | 2857.53 | 701.03 | -0.701 | 1.0 | 359.115 | -209.78 |
| 18.90 | 1061.03 | 2100.0 | -764.22 | 2877.26 | 2877.26 | 746.95 | -0.738 | 1.0 | 361.594 | -225.06 |
| 19.00 | 1055.45 | 2100.0 | -806.93 | 2846.32 | 2896.77 | 792.88 | -0.774 | 1.0 | 364.047 | -240.52 |

*Fig. 8*

VARIABLE RATIO TRANSMISSION

FIELD OF THE INVENTION

The present invention relates to variable ratio transmission having an infinitely variable ratio, for example enabling a prime mover, such as a wind or tidal turbine running at relatively low but continuously varying speeds to drive smoothly a constant speed machine, such as a synchronous generator, without excessive transient torques.

BACKGROUND OF THE INVENTION

In particular, the requirement for speed increasing transmissions for wind turbines stems from their low rotational speed compared with the preferred generator speed, typically 1500 rpm. The low turbine speed is dictated by the fact that wind energy generation is a function of the turbine-swept area and the blade tip speed limits. Thus, the higher the power, the lower the rotor speed. In effect, power is directly proportional to the rotor diameter squared, while rotor speed is inversely proportional to tip diameter and/or the square root of rotor power; e.g. a 3000 kW turbine would run at 16 rpm compared with 44 rpm for a 400 kW machine with the same tip speed. Since rotor weight and torque are directly proportional to the rotor diameter cubed; bigger turbines not only have bigger transmission step up ratios but even bigger input torques and therefore a lower power to weight ratio. For example, whereas a 3000 kW turbine generates 7.5 times the power of a 400 kw machine, its torque and weight are increased by a factor of 20.54 (i.e. 7.5 raised to the power of 1.5), while its ratio is increased by a factor of 2.74 because its speed is reduced by the square root of 7.5.

Since the volume, weight and price of a gearbox is governed by its torque and overall ratio, there is an incentive to reduce weight by reducing the parasitic transient overload torques, which typically occur (and for which provision is made) in all fixed ratio wind turbine transmissions. These are created by the stochastic variations in wind speed, air density and unit aerodynamic energy over the large swept area of the turbine. Such variations lead to speed fluctuations of the turbine rotor hub at its input to the gearbox, which may occur many times per revolution. This is further complicated, firstly by steady changes in wind speed and secondly by the sudden changes which occur during gusts. Since wind energy is directly related to air velocity cubed, a 50% transient speed increase will increase aerodynamic power by a factor of 3. While some of this power will be dissipated by lower efficiency and some by the increased speed and kinetic energy in the turbine, it follows that with a fixed ratio transmission additional torques will be generated in trying to accelerate the generator. This stems from the fact that the polar moment of inertia of a generator about its own axis when referred to the axis of the turbine rotor is multiplied by the square of the step up ratio. Thus a generator requiring a step up ratio of 80/1 would have a referred inertia 6400 times that about its own axis. A 1-degree angular deviation of the turbine rotor hub from its mean speed of rotation would therefore suggest an 80 degree fluctuation of the generator over the same time scale.

An asynchronous generator can employ power conditioning to produce a smooth electrical output, but this masks the problem because mechanical acceleration torques are still required to change its speed. Such transient acceleration torques can only be mitigated by strain energy in the mechanical transmission path and so more rigid, transmissions will have higher torques.

The variable ratio transmission obviates this problem by changing its ratio in a complementary way, at the same rate as the transient change in the turbine speed. By so doing, generator torque, speed and phase angle are kept constant by allowing the turbine to accelerate and absorb the transient excess of power in the form of kinetic energy.

Prior variable ratio gearboxes for example as described in the present applicant's prior patent application WO 2004/109157, have been employed for applications including wind power turbines. However, their complication, for example, the need to use consumable components such as clutches and alternative power routes, increases their size, weight and manufacturing costs. The inventor has realised that a simple variable ratio gearbox is required which, in embodiments, provides generator speed control and a simple design.

SUMMARY OF THE INVENTION

According to one aspect the present invention consists in a variable ratio transmission for wind or tidal power generation applications, suitable for providing a substantially constant speed output from a prime mover input which varies in speed at least within an input speed range where all power generating takes place, the transmission including a primary differential gear train, having a prime mover input, and a driving output, wherein the ratio of the input speed to output speed is variable, and wherein said ratio is governed by the reaction torque provided by speed controlling gearing within the primary differential, the transmission including also a secondary differential gear train, which is in rotational communication with the input via a first route is in rotational communication with the speed controlling gearing via a second different route, wherein the secondary differential gear train includes two parallel power paths, one path including a hydraulic bypass having two hydraulic units in a hydraulic circuit; the power transmitted and direction of power transmitted in the hydraulic circuit of the bypass path being selectively variable in use to vary the speed in the other path, thereby to alter the power in the second route and to alter the reaction torque of the speed controlling gearing and thereby to govern said ratio, the transmission being characterized in that the first and second routes are utilized for the whole input speed range.

Preferably, the first and second routes are clutchless.

In an embodiment the units have power transmitted in one direction between them, when the input speed is below a predetermined value in the range, and said power transmission direction is reversed when said speed is reached or exceeded.

Preferably the hydraulic units are each driven at a speed which is proportional to the input speed.

More preferably each hydraulic unit is a positive displacement device having a variable stroke to alter hydraulic volumetric flow rate or pressure. Preferably the stroke of the one or both units is adjusted to alter the power transmitted in the bypass path.

In one arrangement, the primary and/or secondary differential gear trains include epicyclic gear trains. If so, the primary and secondary gear trains may both be epicyclic gear trains and any one or more of the following epicyclic arrangements may exist:

the first input to the primary differential is the planet carrier of the primary differential;

the output of the primary differential is the annulus of the primary differential;

the speed controlling gear of the primary differential is the sun wheel of the primary differential;

the two power paths of the secondary differential include the planet carrier and the sun wheel of the secondary differential.

The invention extends to a transmission system including: (a) a low speed fixed ratio step up stage; and (b) a variable ratio stage, having an input shaft, for receiving a steplessly variable input speed from the fixed ratio stage and providing a constant output speed on its output shaft wherein the variable ratio stage includes or comprises gearing as claimed in any one preceding claim.

Preferably, the fixed ratio stage includes two epicyclic stages in series. The invention extends to a fluid driven prime mover drivingly connected to a generator via a variable ratio transmission as described above.

The invention extends to any novel feature described herein and to any novel combination of features described herein, whether or not those features are described in combination herein. For example, the invention may consist in a variable ratio transmission for wind or tidal power generation applications, suitable for providing a substantially constant speed output from a prime mover input which varies in speed at least within an input speed range where all power generating takes place, the transmission including a primary differential gear train, having a prime mover input, and a driving output, wherein the ratio of the input speed to output speed is variable, and wherein said ratio is governed by the reaction torque provided by speed controlling gearing within the primary differential, the transmission including also a secondary differential gear train, which is in rotational communication with the input via a first route and is in rotational communication with the speed controlling gearing via a second different route, wherein the secondary differential gear train includes two parallel power paths, one path including a hydraulic bypass having two hydraulic units in a hydraulic circuit, the power transmitted and direction of power transmitted in the hydraulic circuit of the bypass path being selectively variable in use to vary the speed in the other path, thereby to alter the power in the second route and to alter the reaction torque of the speed controlling gearing and thereby to govern said ratio, the transmission being characterized in that the first and second routes are clutchless.

BRIEF DESCRIPTION OF THE DRAWING FIGURES

The invention may be performed in various ways and a specific embodiment will now be described with reference to the accompanying drawings in which:

FIG. 8 is a table of variables.

DETAILED DESCRIPTION OF THE INVENTION

Figure 1A:
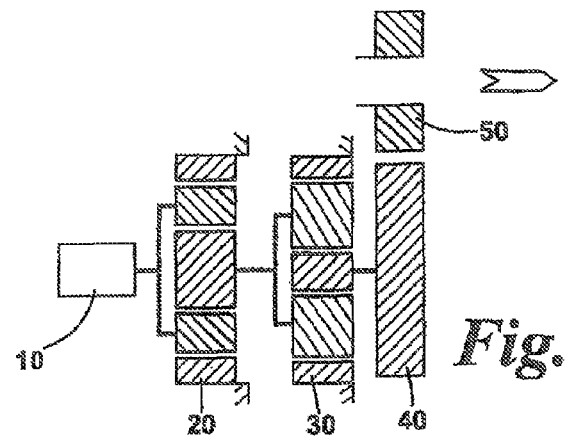
FIG. 1a is a sectional schematic view of step-up gearing for use with the gearing showing in FIG. 1b.

Referring to FIG. 1a, step-up gearing is shown having two epicyclic gear trains 20 and 30, in series which converts the relatively slow rotation of a wind turbine input shaft 10 into a faster rotation at pinion 40. Since the gearing in FIG. 1a produces a large increase in rotation speed, it follows that small variations in turbine speed at input shaft 10 are amplified into large changes in the speed of the pinion 40. It is desirable to have a constant speed to drive a synchronous generator and so pinion 40 is connected to the input gear 50 of variable ratio gearing shown in detail in FIG. 1b.

Figure 1B:
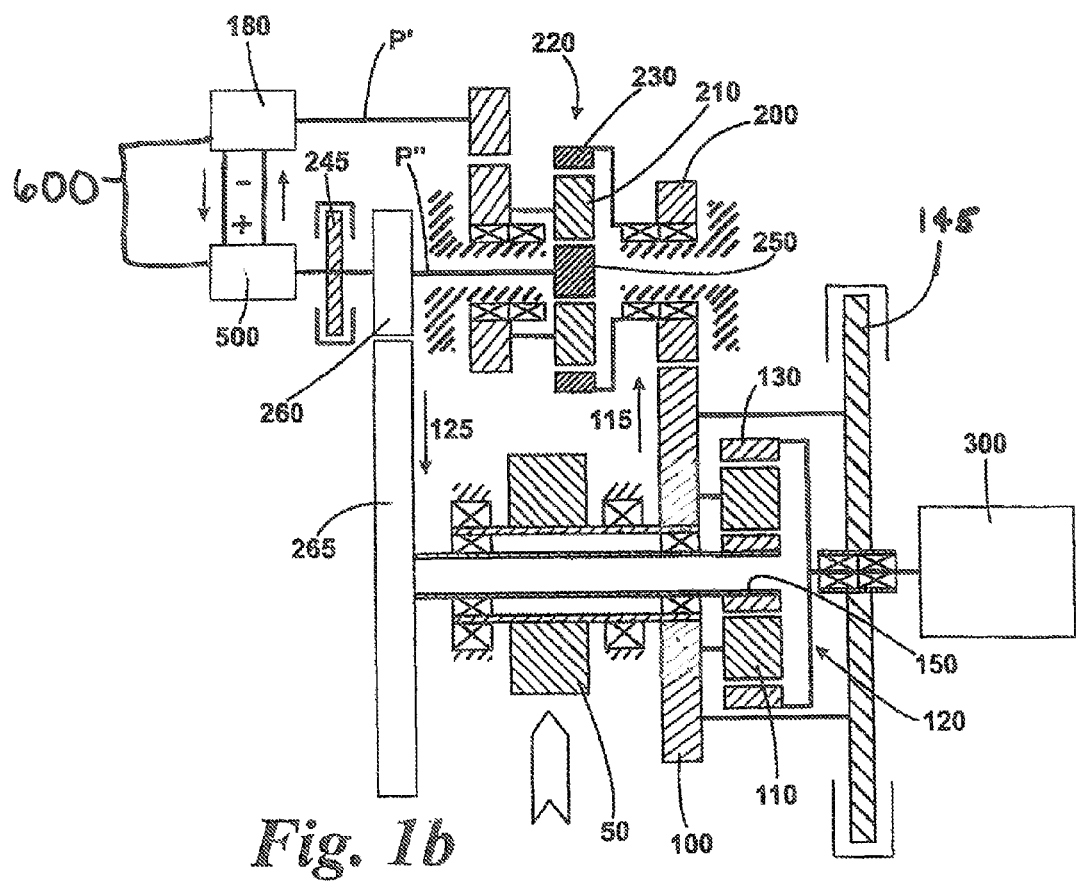
FIG. 1b is a part cross sectional schematic view of an assembly of gearing and a generator.

Referring to FIG. 1b, the input gear 50 is shown which is driven at varying speeds by the gearing shown in FIG. 1a. Input gear 50 drives a primary pinion 100. Primary pinion 100 is in turn connected to a planet carrier 110 of a primary epicylic differential 120 and also drives a secondary pinion 200 along a first power transmission route 115. The planet carrier 110 drives generator 300, via an annulus 130 of the primary epicyclic differential 120.

In use, the reaction torque of the sun gear 150 of the primary differential can control the speed of the generator 300. In use, when the input is slow, the sun gear 150 needs to be turned in the same direction as the input (the planet carrier 110) to increase the effective speed of the annulus 130 and hence the generator 300, and when the input is faster, the sun gear 150 needs to stop, or slip in the opposite direction to the input to slow the annulus 130 down. The reaction torque on the sun gear 150 can be used to control its speed, either driving the annulus 130 faster when higher torque is applied or being driven (slipping) in the opposite direction, when lower torque is applied.

The reaction torque of the sun gear is controlled by a secondary differential epicyclic gear train 220. The secondary differential has an annulus 230 connected to the secondary pinion 200. Two power paths P' and P'' are defined by the planet carrier 210 and the sun gear 250 of the secondary differential 220. The planet carrier 210 is in rotary connection with one of two hydraulic units 180, the sun gear 250 being in rotary connection with the other unit 500. In this instance the sun gear 250 is connected also a pair of pinions 260, 265 which receive torque from or provide torque to the sun gear 150 of the primary differential 120 and define a second power route 125.

The power transmitted through the hydraulic bypass and the direction in which it flows are controlled by altering the stroke of the two hydraulic units. This in turn alters the reaction torque at sun gear 150 and consequential alters the output speed of the primary differential. A controller 600 is used to monitor, input speed and pressure in the hydraulic bypass, as well as controlling the stroke rates in the respective hydraulic units 500 and 180.

In use the gearing has a number of modes of operation as are described below.

Figure 2:
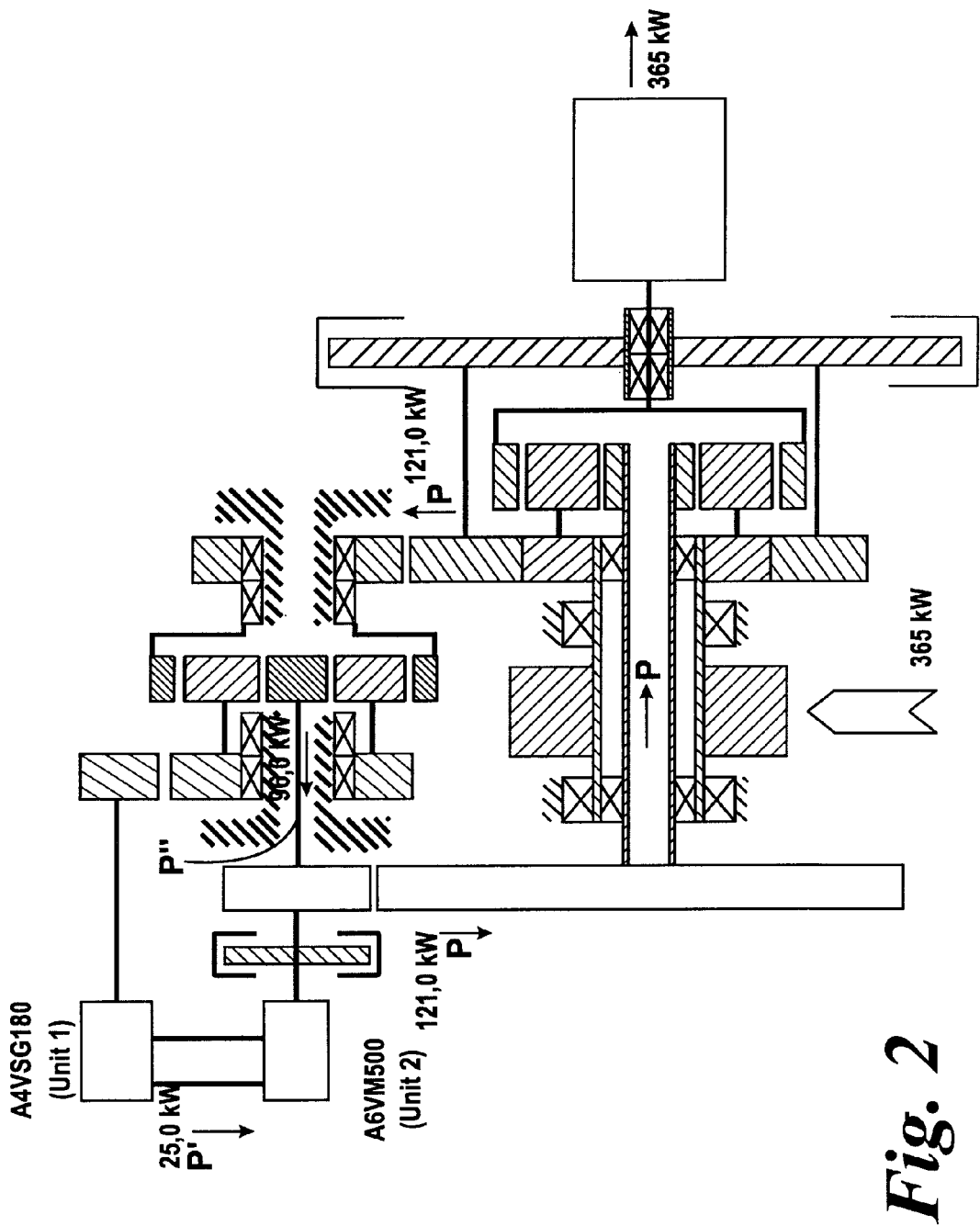
FIGS. 2 to 4 show the gearing of FIG. 1b, illustrating the power transmission during various modes of operation.

Firstly, with reference to FIG. 2, when the input shaft is at or below 11.5 r.p.m then the gearing will operate as a fixed ratio. Hydraulic unit 180 will be set to a near maximum stoke but it will be rotating relatively slowly and hydraulic unit 500 will be set to a near minimum stroke but rotates relatively quickly, so that it is being driven by unit 180. This causes power to be transmitted through the hydraulic bypass and through the gearing in the direction of the arrows P and sun gear 150 provides as much torque as possible in the direction of rotation of the planet carrier 110, to increase the speed of the generator 300. However, at this input speed the generator does not reach the desired 1500 r.p.m. and so the output speed (generator speed) is allowed to vary with input speed and the generator is not connected to the grid system because it is not at rotating at the correct speed.

Figure 3:
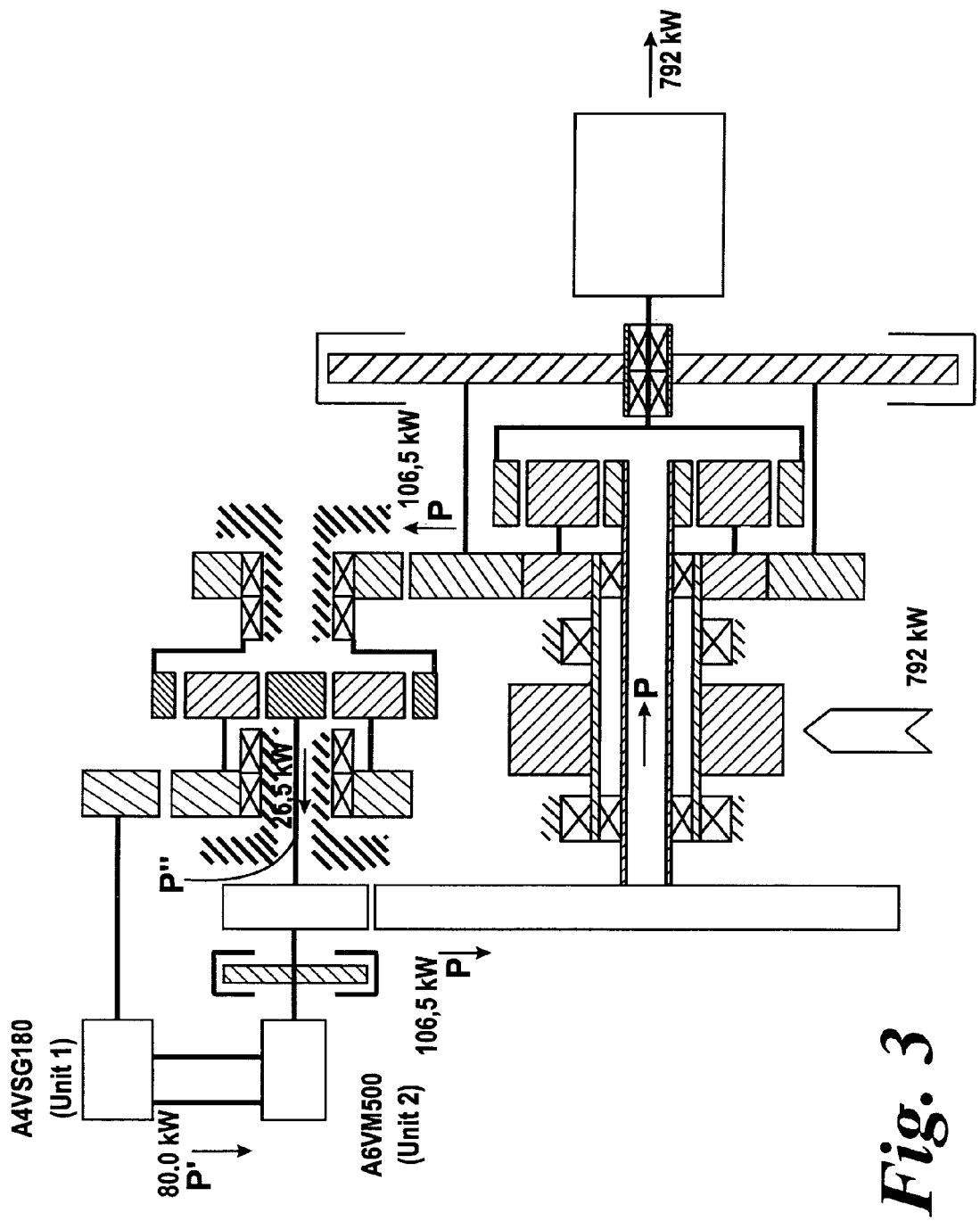

Secondly, with reference to FIG. 3, when the input is in the range of about 11.5 r.p.m to about 17.3 r.p.m, which is the usual input speed range, a second mode of operation is employed. In this mode the generator, will be synchronised with the grid system and providing power to the grid, and therefore it is necessary to keep its speed constant. Consequently, the gearing is operated with a variable ratio because the input shaft speed will vary with fluctuations in wind speed etc. The reaction torque provided by sun gear 150 must be sufficient to increase the generator speed, but it must be gradually reduced as the input speed increases from about 11.5 to about 17.3 r.p.m. To achieve this, the amount of power routed through the hydraulic bypass is altered. The power flowing through the bypass can be controlled by adjusting the stroke of one or both hydraulic units. In this mode, the stroke of unit 180 remains at or near maximum and the stroke of unit 500, initially at a minimum, is increased in response to an increase in pressure in the bypass, as a function of input speed. As a consequence of the arrangement of the secondary differential, decreased power flowing through the bypass decreases, overall, the amount of reaction torque produced by sun gear 150, which keeps the output speed to the generator constant as the input speed increases. As the input speed starts to approach about 17.3 r.p.m. the stroke of unit 180 is reduced, but the stroke of unit 500 is maximised.

When the input speed is at about 17.3 r.p.m. then no power flows through the bypass because the stroke of unit 180 is zero and the speed of unit 500 is zero. At this speed the reaction torque required of sun gear 150 is just that needed to stop it slipping. This is the predicted average turning speed for the turbine.

Figure 4:
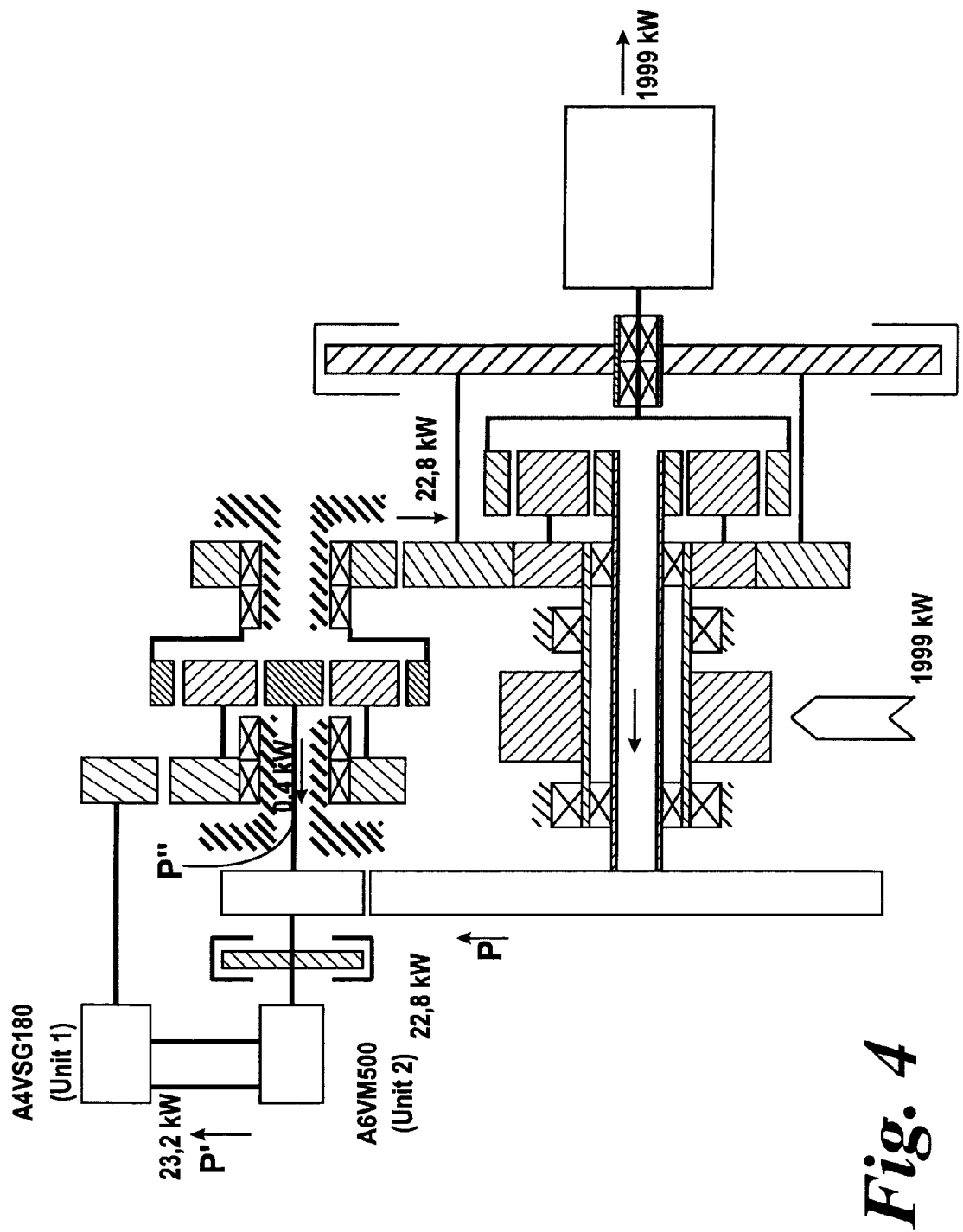

A third mode of operation is used where the rotor speed exceeds 17.3 r.p.m but does not exceed 19 r.p.m. This mode is illustrated in FIG. 4. The generator is still producing power at the desired rotational speed. The sun gear 150 is allowed to slip in the opposite direction to the planet carrier 110 and so it is effectively being driven, to slow the output to the generator 300. To achieve this the stroke of unit 500 remains maximised but the stroke of unit 180 is reversed so the power flow is in the opposite direction. The rotation of the twp units is reversed also. The arrangement of the secondary differential is such that power flows in the direction of arrows P. As the rotor speed increases from about 17.3 to about 19 r.p.m. the stroke of hydraulic unit 180 is progressively increased in the reverse direction, causing more power to flow in the bypass path P'. This causes even more slip in the sun gear 150, to slow the output further.

So as not to cause too much power to flow through the bypass, brakes 145 and/or 245 are used to slow the system when the rotor speed exceeds 19 r.p.m. the brakes are also used for safety purposes, for example during maintenance or when a failure of a component takes place.

Figure 5:
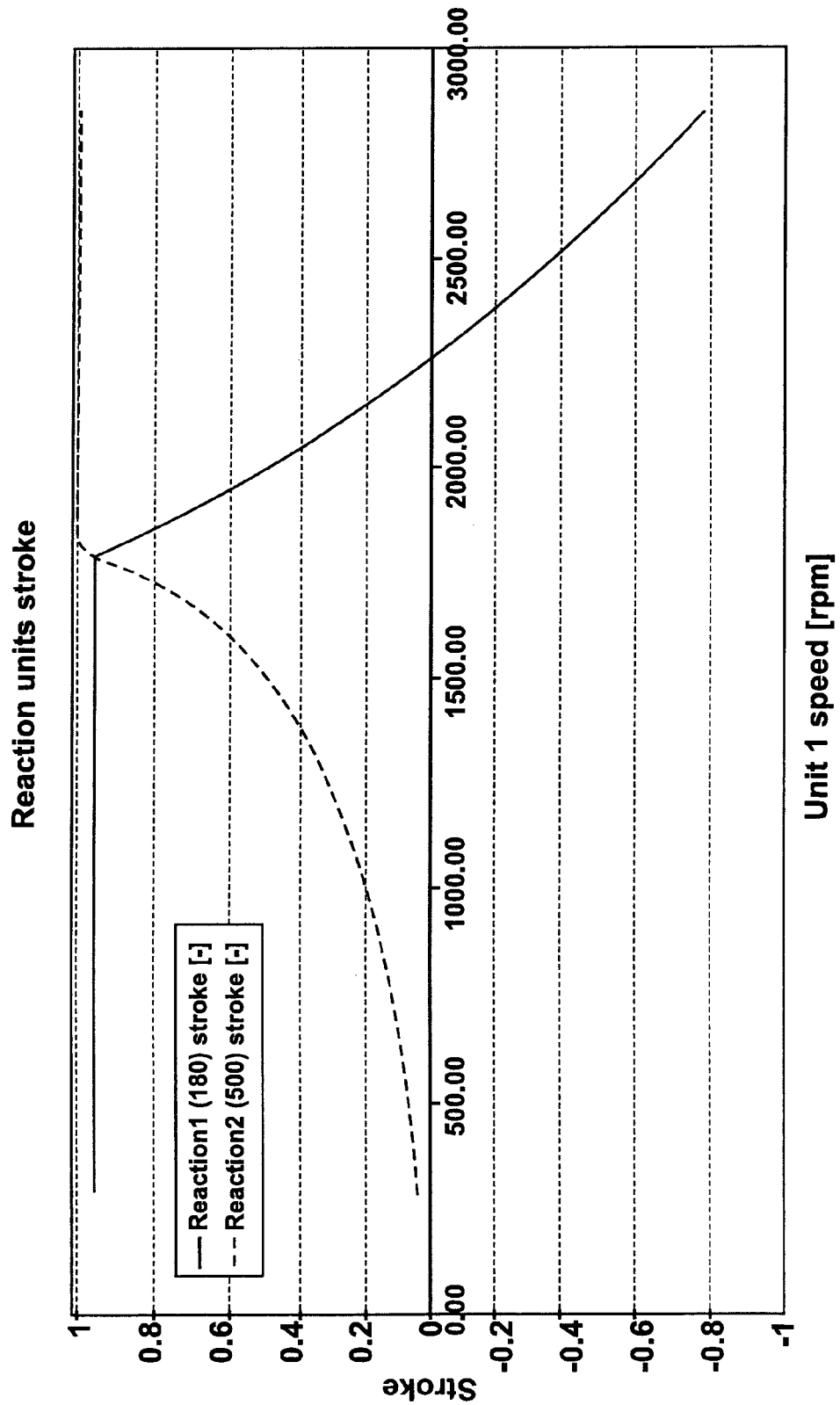
FIG. 5 is a graph indicting relationship of the stroke rates of the hydraulic units used and the speed of one of those hydraulic units.
Figure 6:
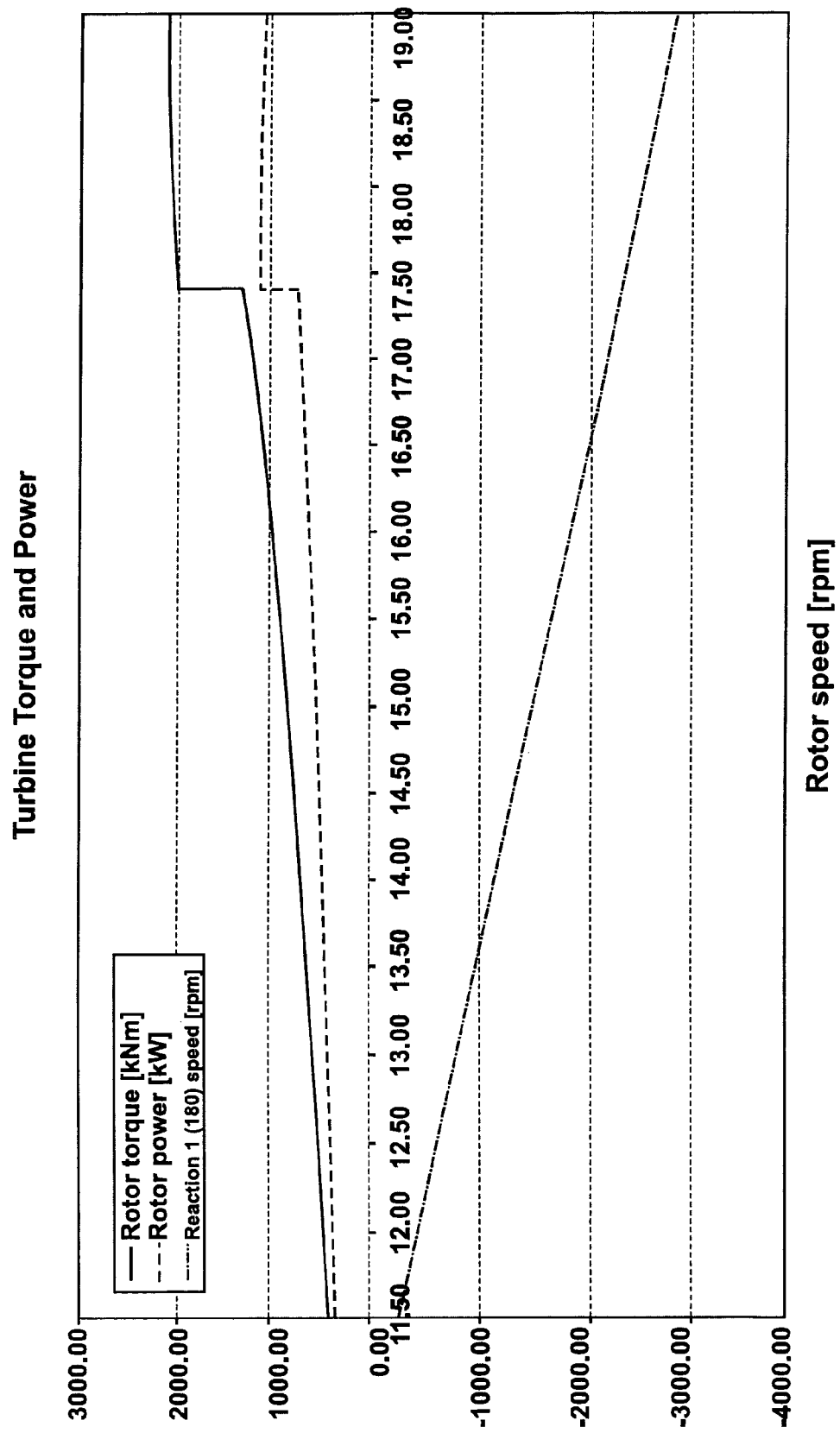
FIG. 6 is a plot of rotor speed against rotor power and torque, and the speed of the hydraulic unit mentioned immediately above.
Figure 7:
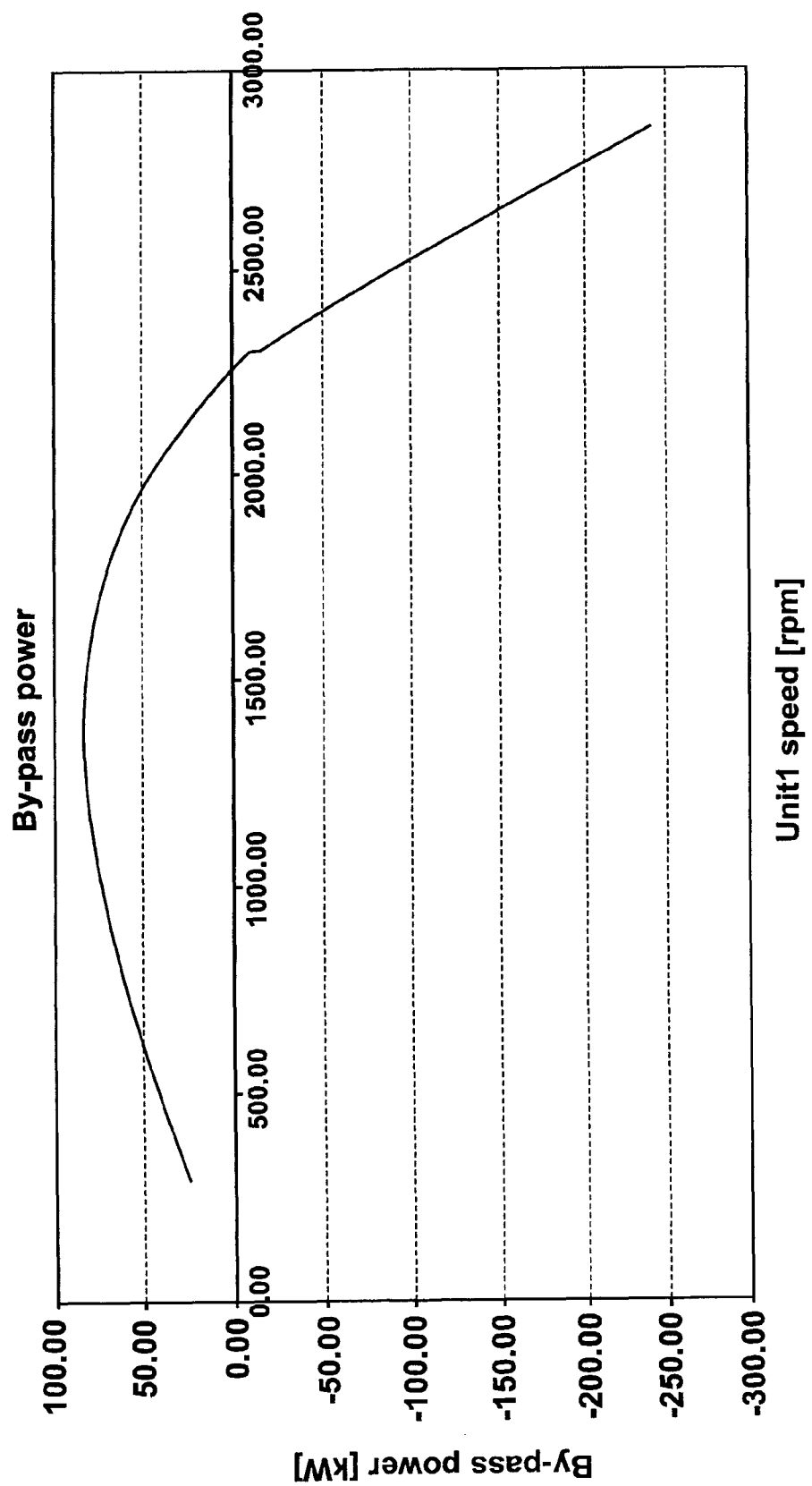
FIG. 7 is a plot of hydraulic unit speed and bypass power.

In practice, the rotor input speed will be varying constantly and so the stroke rates of the hydraulic units 180 and 500 will be adjusted according to FIG. 5 to provide the necessary reaction torque at sun gear 150. FIG. 6 shows the relationship between rotor power and the speed of hydraulic unit 180. The speed of unit 180 increases as rotor speed increases. FIG. 7 shows how the bypass power is controlled as the speed of hydraulic unit 180 (and hence rotor speed) increases. FIG. 8 is a table showing the variables of the transmission system and how each of them change with increasing rotor speed. The respective strokes of the units 180 and 500 may be changed quickly enough to vary the gear ratio and precisely control the output speed. The very high inertia of the turbine ensures that it cannot change speed quickly and therefore, input torque can be very precisely controlled by varying the ratio.

In this application the particular advantage of using a hydraulic transmission to bypass power, is its negligible referred inertia compared with the generator. It is relevant to point out that the collective referred inertia of the gear elements is also negligible for practical purposes. A cross-line controllable relief valve may be employed to respond to any very sudden speed/torque fluctuations which might conceivably outpace the reaction times of the stroke controls of the units.

The use of just two different power routes 115 and 125 to the secondary differential, utilized across the whole power generating input regime (the second and third power generating modes) simplifies the transmission construction and reduces costs and weight. The use of the two routes means that clutches etc are not required to for example to alter the path of the power.

One specific embodiment has been described above and illustrated, but it will readily apparent to the skilled addressee that many variants, modifications and alternatives will be possible within the ambit of the claims. For example, epicyclic differential gear trains have been described and illustrated, but other differential arrangements can be employed to useful effect.

The invention claimed is:

1. A variable ratio transmission for wind or tidal power generation applications, suitable for providing a substantially constant speed output from a prime mover input which varies in speed at least within an input speed range where all power generating takes place, the transmission including a primary differential gear train, having a prime mover input, and a driving output, wherein the ratio of the input speed to output speed is variable, and wherein said ratio is governed by a reaction torque provided by speed controlling gearing within the primary differential, the transmission including also a secondary differential gear train, which is in rotational communication with the input via a first route and is in rotational communication with the speed controlling gearing via a second different route, wherein the secondary differential gear train includes two parallel power paths, one path including a hydraulic bypass having two hydraulic units in a hydraulic circuit, the power transmitted and direction of power transmitted in the hydraulic circuit of a bypass path being selectively variable in use to vary the speed in another path, thereby to alter the power in the second route and to alter the reaction torque of the speed controlling gearing and thereby to govern said ratio, the transmission being characterized in that the first and second routes are utilized for the whole input speed range.

2. A variable ratio transmission according to claim 1 wherein the first and second routes are clutchless.

3. A variable ratio transmission according to claim 2 wherein the units have power transmitted in one direction between them, when the input speed is below a predetermined value in the range, and said power transmission direction is reversed when said speed is reached or exceeded.

4. A variable ratio transmission according to claim 2 wherein the hydraulic units are each driven at a speed which is proportional to the input speed.

5. A variable ratio transmission according to claim 4 wherein each hydraulic unit is a positive displacement device having a variable stroke to alter volumetric flow rate or pressure.

6. A variable ratio transmission according to claim 5 wherein the stroke of one or both units is adjusted to alter the power transmitted in the bypass path.

7. A variable ratio transmission according to claim 2 wherein the primary and/or secondary differential gear trains include epicyclic gear trains.

8. A variable ratio transmission according to claim 1 wherein the hydraulic units have power transmitted in one direction between them, when the input speed is below a predetermined value in the range, and said power transmission direction is reversed when said input speed is reached or exceeded.

9. A variable ratio transmission according to claim 8 wherein the hydraulic units are each driven at a speed which is proportional to the input speed.

10. A variable ratio transmission according to claim 9 wherein each hydraulic unit is a positive displacement device having a variable stroke to alter volumetric flow rate or pressure.

11. A variable ratio transmission according to claim 10 wherein the variable stroke of one or both units is adjusted to alter the power transmitted in the bypass path.

12. A variable ratio transmission according to claim 8 wherein the primary and/or secondary differential gear trains include epicyclic gear trains.

13. A variable ratio transmission according to claim 1 wherein the hydraulic units are each driven at a speed which is proportional to the input speed.

14. A variable ratio transmission according to claim 13 wherein each hydraulic unit is a positive displacement device having a variable stroke to alter volumetric flow rate or pressure.

15. A variable ratio transmission according to claim 14 wherein the stroke of one or both units is adjusted to alter the power transmitted in the bypass path.

16. A variable ratio transmission according to claim 13 wherein the primary and/or secondary differential gear trains include epicyclic gear trains.

17. A variable ratio transmission according to claim 1 wherein the primary and/or secondary differential gear trains include epicyclic gear trains.

18. A variable ratio transmission according to claim according to claim 17, wherein the primary and secondary gear trains are both epicyclic gear trains and any one or more of the following epicyclic arrangements exist: the prime mover input to the primary differential is the planet carrier of the primary differential; the output of the primary differential is the annulus of the primary differential; the speed controlling gear of the primary differential is the sun wheel of the primary differential; the two power paths of the secondary differential include the planet carrier and the sun wheel of the secondary differential.

19. A transmission system including: (a) a low speed fixed ratio step up stage; and (b) a variable ratio stage, having an input shaft, for receiving a steplessly variable input speed from the fixed ratio stage and providing a constant output speed on its output shaft wherein the variable ratio stage includes or comprises a transmission as claimed in claim 1.

20. A transmission system as claimed in claim 19 wherein the fixed ratio stage includes two epicyclic stages in series.

* * * * *